US012756718B2

(12) United States Patent
Solorzano

(10) Patent No.: US 12,756,718 B2
(45) Date of Patent: Oct. 6, 2026

(54) VIDEO PORT AUTHENTICATION FOR MULTI-LEVEL SECURITY DEVICES

(71) Applicant: Raytheon Company, Arlington, VA (US)

(72) Inventor: Paul R. Solorzano, Clearwater, FL (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/941,619

(22) Filed: Nov. 8, 2024

(65) Prior Publication Data

US 2025/0159107 A1 May 15, 2025

Related U.S. Application Data

(60) Provisional application No. 63/597,972, filed on Nov. 10, 2023.

(51) Int. Cl.
*H04L 9/40* (2022.01)

(52) U.S. Cl.
CPC .................................. *H04L 63/105* (2013.01)

(58) Field of Classification Search
CPC ...................................................... H04L 63/105
See application file for complete search history.

(56) References Cited

U.S. PATENT DOCUMENTS 8,799,939 B2 * 8/2014 Hirai ................ H04N 21/43632 348/553
8,826,339 B2 * 9/2014 Brouda ................ H04N 21/426 725/51
9,769,417 B1 * 9/2017 Yarygin ................. H04N 7/083
2010/0095319 A1 * 4/2010 Tran ................... H04N 21/4438 348/E7.003
2012/0151525 A1 * 6/2012 Demchenko ..... H04N 21/42208 345/173
2012/0159534 A1 * 6/2012 Quan ................. H04N 21/4627 725/31
2015/0187205 A1 * 7/2015 Poder ................... H04N 21/251 340/541
2015/0213275 A1 * 7/2015 Reese ..................... G06F 21/84 726/26
2016/0295221 A1 10/2016 Altmann et al.
2018/0330128 A1 11/2018 Luo et al.
2019/0098251 A1 * 3/2019 Herbert ................ H04N 19/467
2022/0109913 A1 4/2022 Huang et al.
2024/0015142 A1 * 1/2024 Wei ..................... H04L 63/0428

(Continued)

OTHER PUBLICATIONS

"International Application Serial No. PCT US2024 055105, International Search Report mailed Feb. 10, 2025", 4 pgs.

(Continued)

*Primary Examiner* — Stephen T Gundry

(74) *Attorney, Agent, or Firm* — Schwegman Lundberg & Woessner, P.A.

(57) ABSTRACT

A video receiver receives a security level of a video source. The security level is stored in a blanking region of a video transmission. The video receiver compares the security level of the video transmission with a security level stored in the video receiver. The video transmission is processed as a function of the comparison of the security level of the video transmission with the security level of the video receiver.

15 Claims, 5 Drawing Sheets

(56) References Cited

U.S. PATENT DOCUMENTS

| | | | | |
|---|---|---|---|---|
| 2024/0114150 | A1* | 4/2024 | Chow | H04N 19/172 |
| 2024/0144897 | A1* | 5/2024 | Kaliyamoorthy | G09G 5/12 |
| 2024/0223356 | A1* | 7/2024 | Rao | H04L 9/0618 |
| 2024/0283835 | A1* | 8/2024 | Loukianov | H04L 65/61 |
| 2024/0320785 | A1* | 9/2024 | Dallal | G02B 27/017 |
| 2024/0394388 | A1* | 11/2024 | Laslo | H04N 21/4405 |
| 2025/0001298 | A1* | 1/2025 | Weiner | A63F 13/212 |
| 2025/0061300 | A1* | 2/2025 | Williams | G06K 15/181 |
| 2025/0168295 | A1* | 5/2025 | Zhou | H04L 41/0833 |
| 2025/0385982 | A1* | 12/2025 | Chon | H04N 5/38 |
| 2026/0052223 | A1* | 2/2026 | Nakahama | H04N 7/0125 |

OTHER PUBLICATIONS

"International Application Serial No. PCT US2024 055105, Written Opinion mailed Feb. 10, 2025", 5 pgs.

* cited by examiner

VIDEO PORT AUTHENTICATION FOR MULTI-LEVEL SECURITY DEVICES

CROSS-REFERENCE TO RELATED APPLICATIONS

This application claims the benefit of U.S. Provisional Application No. 63/597,972 filed Nov. 10, 2023, under 35 U.S.C. § 119(e) which application is hereby incorporated herein by reference in its entirety.

TECHNICAL FIELD

Embodiments described herein generally relate to video port authentication for multi-level security devices.

BACKGROUND

In some video transmission and processing environments, there is a possibility of a security mismatch between a video transmitting device and a video receiving device. For example, a video transmission with a first security level, such as top secret in the military, if sent to a video receiver with a second, different security level, such as secret, would be unable to be processed by the video receiver. However, it can at times be difficult to properly label the security level of video transmitters and receivers. The art is therefore in need of a system to prevent port misconfiguration for multi-level security devices and to efficiently and accurately label and process video transmissions over multi-level security devices.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Video standards, such as HDMI (High-Definition Media Interface), DVI (Digital Video Interface) and OpenLDI (Open LCD (Liquid Crystal Display) Display Interface) define an active video region of pixel information and also blanking regions of transmission control information such as vertical synchronization and horizontal synchronization strobes that define the video frame boundaries in terms of pixels in the vertical dimension by the pixels in the horizontal dimension. The video source controls the polarity, duration and location of the vertical (vsync) and horizontal (hsync) synchronization pulses.

Figure 1:
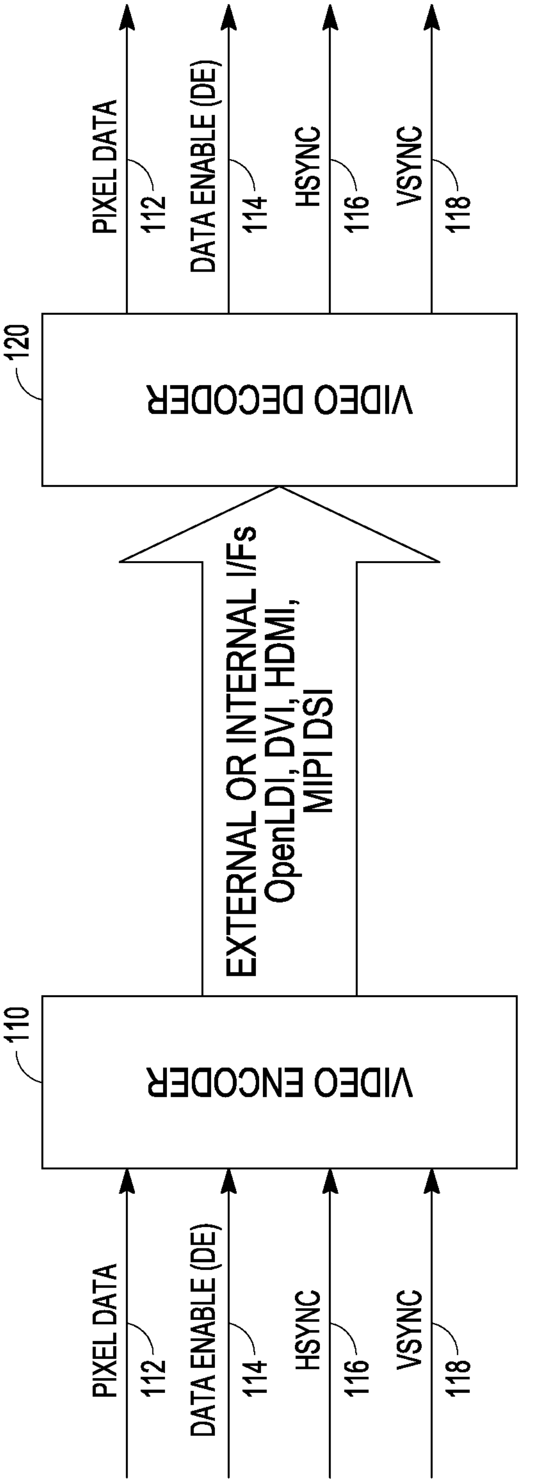
FIG. 1 is a block diagram of a system to prevent port misconfigurations for multi-level security devices.

FIG. 1 is a block diagram of a system that uses the blanking region of a video transmission to prevent port misconfigurations for multi-level security devices. Specifically, the video source encodes vsync and hsync pulses in the blanking region in terms of polarity, duration and location, while the video receiver (sink) detects such encoding, within +/−a pixel clock period, before enabling the video source to pass through. Referring now to FIG. 1, a video encoder or transmitter 110 includes pixel data 112, a data enable signal 114, an hsync pulse 116 and a vsync pulse 118. These data make up the video signal that is transmitted to a video decoder or receiver 120. The video transmitter 110 transmits the video data to the video receiver 120. As noted, these video data can be transmitted by different standards, such as OpenLDI, DVI, HDMI or MIPI DSI. The video decoder then processes the pixel data 112, the data enable signal 114, the hsync pulse 116 and the vsync pulse 118. Specifically, as alluded to above, the control information blanking region of the video transmission is used to encode the port type of the video source so it can be authenticated by the video receiver, without losing frame synchronization.

Figure 2:
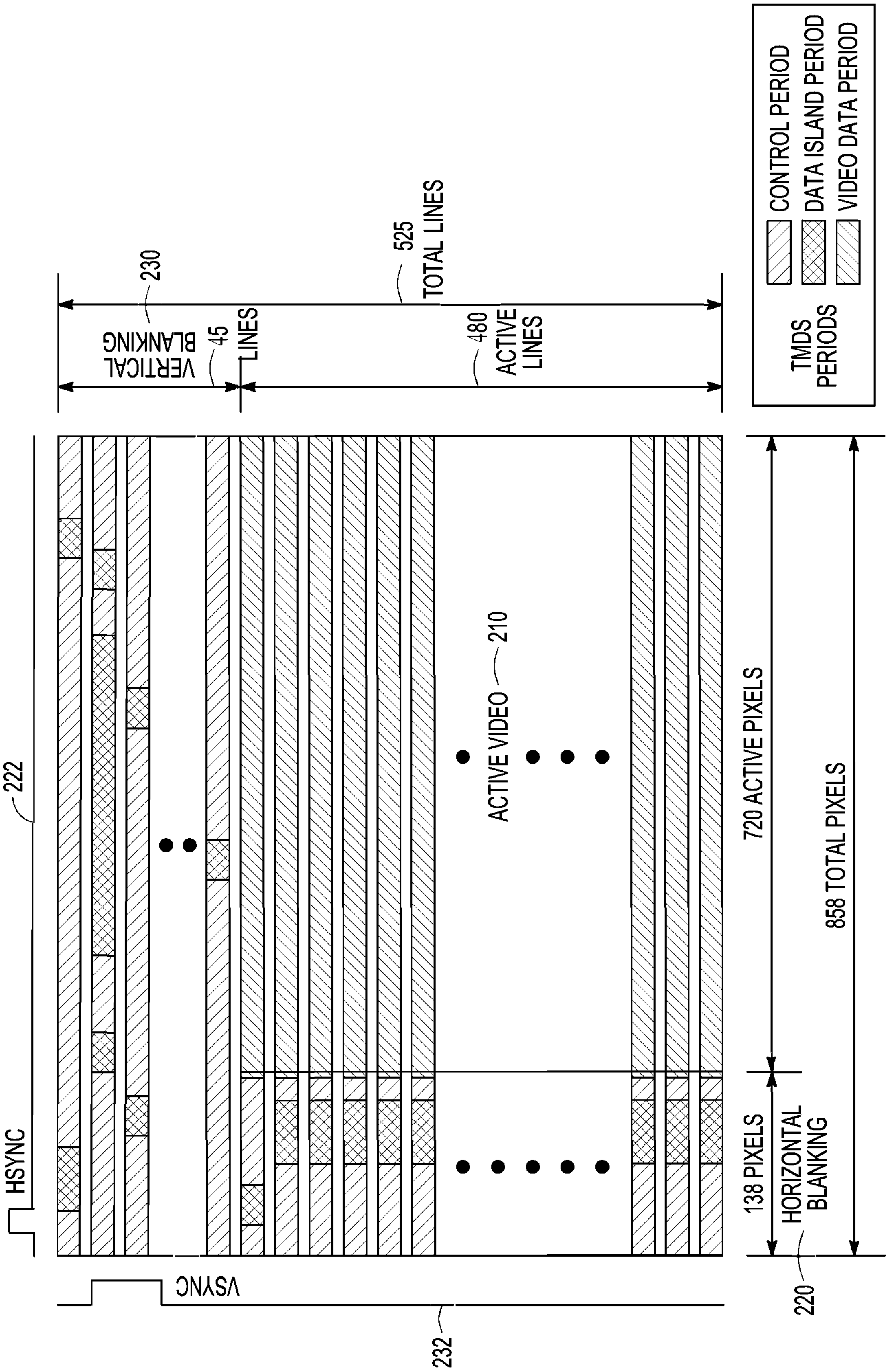
FIG. 2 illustrates a High-Definition Multimedia Interface (HDMI) video control blanking region.

FIG. 2 illustrates an example of an HDMI video control blanking region. A video transmission or signal includes active video data 210, a horizontal blanking region 220 and a vertical blanking region 230. A horizontal hsync pulse 222 is transmitted in the horizontal blanking region 220. Similarly, a vertical vsync pulse 232 is transmitted in the vertical blanking region 230. These hsync and vsync pulses include the security information for the port authentication. FIG. 2 includes the number of pixels in each region, but these figures only represent a particular example.

Figure 3:
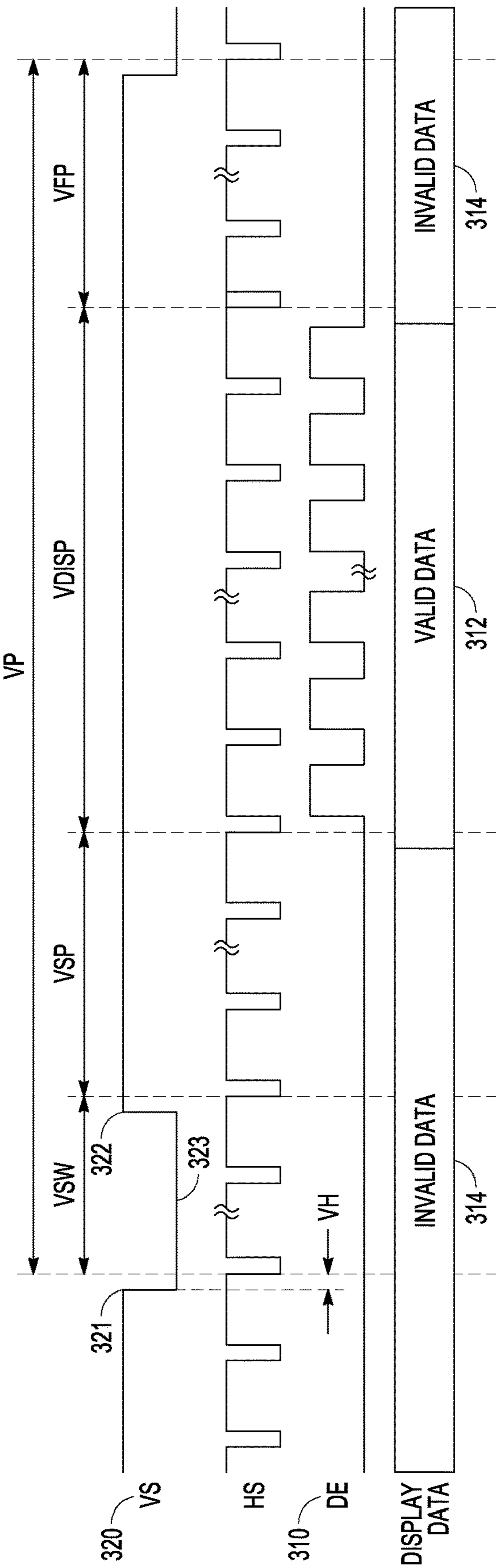
FIG. 3 illustrates an example video data signal.

FIG. 3 illustrates an example video data signal, an in particular, vertical timing and the use of a vsync signal. The data enable signal 310 includes the valid pixel data 312. The invalid data portions 314 are where the blanking regions can be found. In this particular example, a vsync pulse 320 has a particular location (starting point 321 and ending point 322), duration (time between 321 and 322) and polarity 323 (negative). The location, duration and polarity of the hsync and vsync signals define the security level of the transmitting device.

Figure 4:
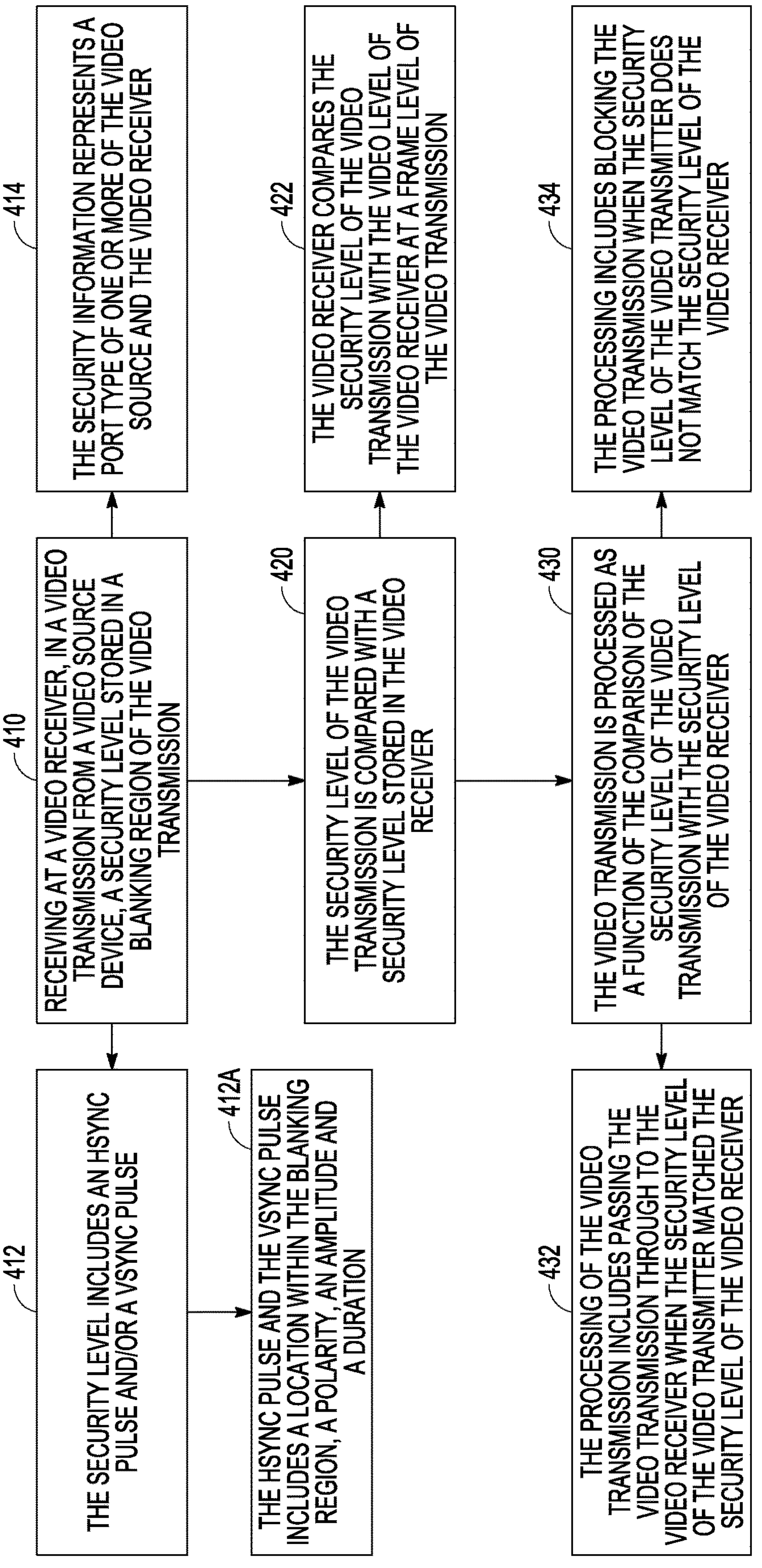
FIG. 4 is a block diagram illustrating operations and features of a system and method to use a video control blanking region in a multi-level security environment.

FIG. 4 illustrates an example embodiment of a system and process for using a video control blanking region in a multi-level security environment. FIG. 4 includes a number of process and feature blocks 410-434. Though arranged substantially serially in the example of FIG. 4, other examples may reorder the blocks, omit one or more blocks, and/or execute two or more blocks in parallel using multiple processors or a single processor organized as two or more virtual machines or sub-processors.

Referring now specifically to FIG. 4, a process in a multi-level security device includes, at 410, receiving at a video receiver, in a video transmission from a video source device, a security level. The security level is stored in a blanking region of the video transmission. As indicated at 412, the security level includes one or more of a horizontal synchronization (hsync) pulse and a vertical synchronization (vsync) pulse. The horizontal synchronization pulse and/or the vertical synchronization pulse includes a location within the blanking region, a polarity and a duration (412A). As indicated at 414, the security information represents a port type of one or more of the video source and the video receiver.

At 420, the security level of the video transmission is compared with a security level stored in the video receiver. As indicated at 422, the video receiver compares the security level of the video transmission with the video level of the video receiver at a frame level of the video transmission.

Within a frame, the detection of the pulse location, ploarity and duration is executed within a one (1) pixel clock accuracy.

At 430, the video transmission is processed as a function of the comparison of the security level of the video transmission with the security level of the video receiver. As indicated at 432, the processing of the video transmission includes passing the video transmission through to the video receiver when the security level of the video transmitter matched the security level of the video receiver, or at 434, the processing includes blocking the video transmission when the security level of the video transmitter does not match the security level of the video receiver.

Figure 5:
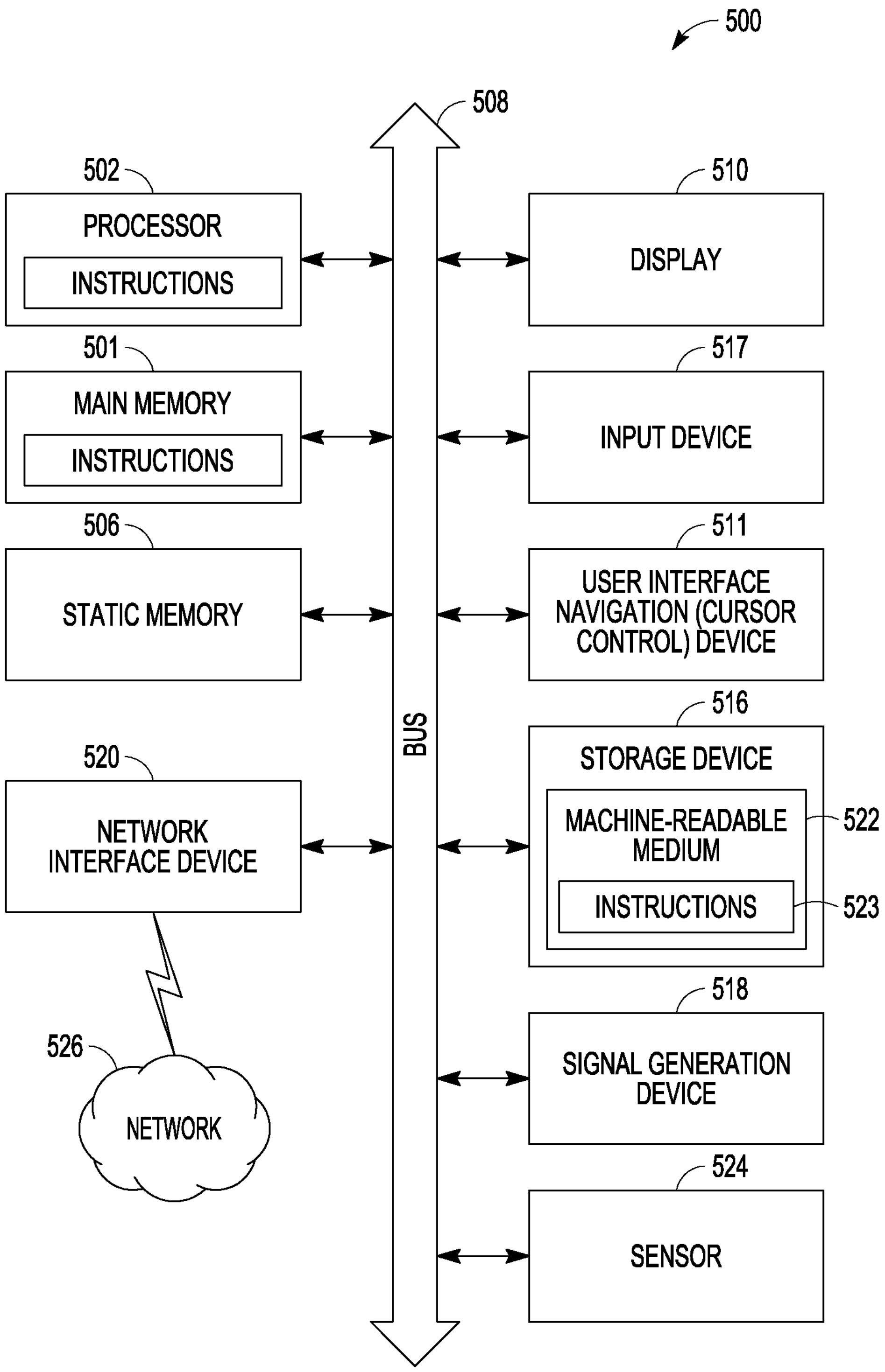
FIG. 5 is a block diagram of a computer architecture upon which one or more embodiments of the present disclosure can execute.

FIG. 5 is a block diagram illustrating a computing and communications platform 500 in the example form of a general-purpose machine on which some or all the operations of FIG. 4 may be carried out according to various embodiments. In certain embodiments, programming of the computing platform 500 according to one or more particular algorithms produces a special-purpose machine upon execution of that programming. In a networked deployment, the computing platform 500 may operate in the capacity of either a server or a client machine in server-client network environments, or it may act as a peer machine in peer-to-peer (or distributed) network environments.

Example computing platform 500 includes at least one processor 502 (e.g., a central processing unit (CPU), a graphics processing unit (GPU) or both, processor cores, compute nodes, etc.), a main memory 501 and a static memory 506, which communicate with each other via a link 508 (e.g., bus). The computing platform 500 may further include a video display unit 510, input devices 517 (e.g., a keyboard, camera, microphone), and a user interface (UI) navigation device 511 (e.g., mouse, touchscreen). The computing platform 500 may additionally include a storage device 516 (e.g., a drive unit), a signal generation device 518 (e.g., a speaker), a sensor 524, and a network interface device 520 coupled to a network 526.

The storage device 516 includes a non-transitory machine-readable medium 522 on which is stored one or more sets of data structures and instructions 523 (e.g., software) embodying or utilized by any one or more of the methodologies or functions described herein. The instructions 523 may also reside, completely or at least partially, within the main memory 501, static memory 506, and/or within the processor 502 during execution thereof by the computing platform 500, with the main memory 501, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 523. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example No. 1 is a process in a multi-level security device comprising receiving a security level of a video source at a video receiver, the security level stored in a blanking region of a video transmission; comparing the security level of the video transmission with a security level stored in the video receiver; and processing the video transmission as a function of the comparison of the security level of the video transmission with the security level of the video receiver.

Example No. 2 includes all the features of Example No. 1, and further optionally includes a process wherein the security level comprises one or more of a horizontal synchronization pulse and a vertical synchronization pulse.

Example No. 3 includes all the features of Example Nos. 1-2, and further optionally includes a process wherein the one or more of the horizontal synchronization pulse and the vertical synchronization pulse comprise a location, a polarity and a duration.

Example No. 4 includes all the features of Example Nos. 1-3, and further optionally includes a process wherein the video receiver compares the security level of the video transmission with the video security level of the video receiver at a frame level of the video transmission.

Example No. 5 includes all the features of Example Nos. 1-4, and further optionally includes a process wherein the processing comprises passing the video transmission through to the video receiver.

Example No. 6 includes all the features of Example Nos. 1-5, and further optionally includes a process wherein the processing comprises blocking the video transmission.

Example No. 7 includes all the features of Example Nos. 1-6, and further optionally includes a process wherein the security information represents a port type of one or more of the video source and the video receiver.

Example No. 8 is a machine-readable medium comprising instructions that when executed by a processor execute a process comprising receiving a security level of a video source at a video receiver, the security level stored in a blanking region of a video transmission; comparing the security level of the video transmission with a security level stored in the video receiver; and processing the video transmission as a function of the comparison of the security level of the video transmission with the security level of the video receiver.

Example No. 9 includes all the features of Example No. 8, and further optionally includes a machine-readable medium wherein the security level comprises one or more of a horizontal synchronization pulse and a vertical synchronization pulse.

Example No. 10 includes all the features of Example Nos. 8-9, and further optionally includes a machine-readable medium wherein the one or more of the horizontal synchronization pulse and the vertical synchronization pulse comprise a location, a polarity and a duration.

Example No. 11 includes all the features of Example Nos. 8-10, and further optionally includes a machine-readable medium wherein the video receiver compares the security level of the video transmission with the video level of the video receiver at a frame level of the video transmission.

Example No. 12 includes all the features of Example Nos. 8-11, and further optionally includes a machine-readable medium wherein the processing comprises passing the video transmission through to the video receiver.

Example No. 13 includes all the features of Example Nos. 8-12, and further optionally includes a machine-readable medium wherein the processing comprises blocking the video transmission.

Example No. 14 includes all the features of Example Nos. 8-13, and further optionally includes a machine-readable medium wherein the security information represents a port type of one or more of the video source and the video receiver.

Example No. 15 is a system comprising a computer processor; and a memory coupled to the computer processor; wherein the computer processor and the memory are operable for receiving a security level of a video source at a video receiver, the security level stored in a blanking region of a video transmission; comparing the security level of the video transmission with a security level stored in the video receiver; and processing the video transmission as a function of the comparison of the security level of the video transmission with the security level of the video receiver.

Example No. 16 includes all the features of Example No. 15, and optionally includes a system wherein the security level comprises one or more of a horizontal synchronization pulse and a vertical synchronization pulse; and wherein the one or more of the horizontal synchronization pulse and the vertical synchronization pulse comprise a location, a polarity and a duration.

Example No. 17 includes all the features of Example Nos. 15-16, and optionally includes a system wherein the video receiver compares the security level of the video transmission with the video level of the video receiver at a frame level of the video transmission.

Example No. 18 includes all the features of Example Nos. 15-17, and optionally includes a system wherein the processing comprises passing the video transmission through to the video receiver.

Example No. 19 includes all the features of Example Nos. 15-18, and optionally includes a system wherein the processing comprises blocking the video transmission.

Example No. 20 includes all the features of Example Nos. 15-19, and optionally includes a system wherein the security information represents a port type of one or more of the video source and the video receiver.

The invention claimed is:

1. A process in a multi-level security device comprising:

receiving a security level of a video source at a video receiver, the security level stored in a blanking region of a video transmission;

comparing the security level of the video transmission with a security level stored in the video receiver; and processing the video transmission as a function of the comparison of the security level of the video transmission with the security level stored in the video receiver;

wherein the security level comprises one or more of a horizontal synchronization (HSYNC) pulse and a vertical synchronization (VSYNC) pulse, and wherein the one or more of the HSYNC pulse and the VSYNC pulse comprise security information for port authentication; and wherein the security information represents a port type of one or more of the video source and the video receiver.

2. The process of claim 1, wherein the one or more of the horizontal synchronization pulse and the vertical synchronization pulse comprise a location, a polarity and a duration.

3. The process of claim 1, wherein the video receiver compares the security level of the video transmission with the video security level of the video receiver at a frame level of the video transmission.

4. The process of claim 1, wherein the processing comprises passing the video transmission through to the video receiver.

5. The process of claim 1, wherein the processing comprises blocking the video transmission.

6. A non-transitory machine-readable medium comprising instructions that when executed by a processor execute a process comprising:

receiving a security level of a video source at a video receiver, the security level stored in a blanking region of a video transmission;

comparing the security level of the video transmission with a security level stored in the video receiver; and processing the video transmission as a function of the comparison of the security level of the video transmission with the security level stored in the video receiver;

wherein the security level comprises one or more of a horizontal synchronization (HSYNC) pulse and a vertical synchronization (VSYNC) pulse, and wherein the one or more of the HSYNC pulse and the VSYNC pulse comprise security information for port authentication; and wherein the security information represents a port type of one or more of the video source and the video receiver.

7. The non-transitory machine-readable medium of claim 6, wherein the one or more of the horizontal synchronization pulse and the vertical synchronization pulse comprise a location, a polarity and a duration.

8. The non-transitory machine-readable medium of claim 6, wherein the video receiver compares the security level of the video transmission with the video level of the video receiver at a frame level of the video transmission.

9. The non-transitory machine-readable medium of claim 6, wherein the processing comprises passing the video transmission through to the video receiver.

10. The non-transitory machine-readable medium of claim 6, wherein the processing comprises blocking the video transmission.

11. A system comprising:

a computer processor; and a memory coupled to the computer processor;

wherein the computer processor and the memory are operable for:

receiving a security level of a video source at a video receiver, the security level stored in a blanking region of a video transmission;

comparing the security level of the video transmission with a security level stored in the video receiver; and processing the video transmission as a function of the comparison of the security level of the video transmission with the security level stored in the video receiver;

wherein the security level comprises one or more of a horizontal synchronization (HSYNC) pulse and a vertical synchronization (VSYNC) pulse, and wherein the one or more of the HSYNC pulse and the VSYNC pulse comprise security information for port authentication; and wherein the security information represents a port type of one or more of the video source and the video receiver.

12. The system of claim 11, wherein the one or more of the horizontal synchronization pulse and the vertical synchronization pulse comprise a location, a polarity and a duration.

13. The system of claim 11, wherein the video receiver compares the security level of the video transmission with the video level of the video receiver at a frame level of the video transmission.

14. The system of claim 11, wherein the processing comprises passing the video transmission through to the video receiver.

15. The system of claim 11, wherein the processing comprises blocking the video transmission.

* * * * *